United States Patent
Bottomley et al.

(10) Patent No.: US 6,333,953 B1
(45) Date of Patent: Dec. 25, 2001

(54) SYSTEM AND METHODS FOR SELECTING AN APPROPRIATE DETECTION TECHNIQUE IN A RADIOCOMMUNICATION SYSTEM

(75) Inventors: Gregory E. Bottomley, Cary; Jyun-Cheng Chen, Chapel Hill; R. David Koilpillai, Apex, all of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 08/897,309

(22) Filed: Jul. 21, 1997

(51) Int. Cl.$^7$ ............................................. H03K 9/00
(52) U.S. Cl. ................................. 375/316; 375/346
(58) Field of Search ........................... 375/316, 325, 375/329, 330, 346, 347, 348, 229, 244, 283; 455/132, 133, 134, 135, 137, 272, 273, 504

(56) References Cited

U.S. PATENT DOCUMENTS

| | | | |
|---|---|---|---|
| 5,230,077 | | 7/1993 | Raith ................................. 455/65 |
| 5,303,263 | * | 4/1994 | Shoji et al. ........................ 375/11 |
| 5,488,635 | * | 1/1996 | Chennakeshu et al. ............ 375/340 |
| 5,499,272 | * | 3/1996 | Bottomley ......................... 375/347 |
| 5,544,156 | * | 8/1996 | Teder et al. ....................... 370/342 |
| 5,553,102 | * | 9/1996 | Jasper et al. ...................... 375/347 |
| 5,563,888 | * | 10/1996 | Parr et al. ........................ 375/344 |
| 5,596,606 | * | 1/1997 | Montreuil ......................... 375/327 |
| 5,615,409 | * | 3/1997 | Forssen et al. .................... 455/440 |
| 5,621,769 | * | 4/1997 | Wan et al. ........................ 375/349 |
| 5,659,573 | * | 8/1997 | Bruckert et al. .................. 375/365 |
| 5,659,576 | * | 8/1997 | Critchlow et al. ................. 375/219 |
| 5,671,221 | * | 9/1997 | Yang ................................. 375/205 |
| 5,680,419 | * | 10/1997 | Bottomley ......................... 375/347 |
| 5,696,800 | * | 12/1997 | Berger ............................. 375/361 |
| 5,727,028 | * | 3/1998 | Ghosh et al. ..................... 375/340 |
| 5,822,380 | * | 8/1999 | Bottomley ......................... 375/254 |
| 5,838,740 | * | 11/1998 | Kallman et al. .................. 375/246 |
| 5,867,478 | * | 2/1999 | Baum et al. ...................... 370/208 |
| 5,867,538 | * | 2/1999 | Liu .................................. 375/341 |
| 5,937,015 | * | 8/1999 | Dent et al. ....................... 375/341 |
| 5,946,350 | * | 8/1999 | Uesugi ............................. 375/233 |

* cited by examiner

Primary Examiner—Chi Pham
Assistant Examiner—Emmanuel Bayard
(74) Attorney, Agent, or Firm—Burns, Doane, Swecker & Mathis, L.L.P.

(57) ABSTRACT

Techniques for adapting detection schemes used in receivers for receiving radio signals are described. The received signal is processed to determine, for example, an amount of time dispersion present in the radio channel. Based on this determination an appropriate detection scheme is selected for detecting the transmitted symbols. Various techniques for determining the dispersive or non-dispersive nature of the channel are described.

17 Claims, 5 Drawing Sheets

SYSTEM AND METHODS FOR SELECTING AN APPROPRIATE DETECTION TECHNIQUE IN A RADIOCOMMUNICATION SYSTEM

BACKGROUND

In recent years, digital wireless communication systems have been used to convey a variety of information between multiple locations. With digital communications, information is translated into a digital or binary form, referred to as bits, for communications purposes. The transmitter maps this bit stream into a modulated symbol stream, which is detected at the digital receiver and mapped back into bits and information.

In digital wireless communications, the radio environment presents many difficulties that impede successful communications, for example, those caused by the many signal paths traversed by radio signals before arriving at a receiver. One difficulty occurs when the multiple signal paths are much different in length. In this case, time dispersion occurs, in which multiple signal images arrive at the receiver antenna at different times, giving rise to signal echoes. This causes intersymbol interference (ISI), where the echoes of one symbol interfere with subsequent symbols.

Time dispersion can be mitigated by using an equalizer. Common forms of equalization are provided by linear equalizers, decision-feedback equalizers, and maximum-likelihood sequence-estimation (MLSE) equalizers. A linear equalizer tries to undo the effects of the channel by filtering the received signal. A decision-feedback equalizer exploits previous symbol detections to cancel out the intersymbol interference from echoes of these previous symbols. Finally, an MLSE equalizer hypothesizes various transmitted symbol sequences and, with a model of the dispersive channel, determines which hypothesis best fits the received data. These equalization techniques are well known to those skilled in the art, and can be found in standard textbooks such as J.G. Proakis, *Digital Communications*, 2nd ed., New York: McGraw-Hill, 1989. Equalizers are commonly used in TDMA systems, such as D-AMPS and GSM.

Of the three common equalization techniques, MLSE equalization is preferable from a performance point of view. In the MLSE equalizer, all possible transmitted symbol sequences are considered. For each hypothetical sequence, the received signal samples are predicted using a model of the multipath channel. The difference between the predicted received signal samples and the actual received signal samples, referred to as the prediction error, gives an indication of how good a particular hypothesis is. The squared magnitude of the prediction error is used as a metric to evaluate a particular hypothesis. This metric is accumulated for different hypotheses for use in determining which hypotheses are better. This process is efficiently realized using the Viterbi algorithm, which is a form of dynamic programming.

However, under certain operating conditions, signals arriving at a receiver may not create significant levels of intersymbol interference. When ISI is insignificant, or absent, the equalizer actually adds more noise to the detection statistic than it removes, particularly when the channel varies rapidly. Under these conditions, it would be desirable to switch the equalizer off in favor of another detection device, e.g., a differential detector, which may perform better under non-time dispersive conditions. Moreover, an equalizer is relatively complex computationally compared with a differential detector. Thus, periodically switching off the equalizer in favor of a differential detector would save MIPS which, in turn, would reduce battery consumption.

As another example, in direct sequence CDMA systems, RAKE receivers are commonly employed. However, if too many RAKE taps are employed, performance degrades.

Accordingly, it would be desirable to provide a receiver in which an appropriate detection technique could be dynamically identified and implemented, e.g., a detector which uses an appropriate number of channel taps.

SUMMARY

According to exemplary embodiments of the present invention, the characteristics of the radio channel are measured in order to determine an appropriate detection strategy for implementation in a detector. For example, if the radio channel is determined to be nondispersive, then a differential detector can be selected for operation as a symbol detector. Alternatively, if a time dispersive channel is detected, then an equalizer can be used to detect information symbols received at a receiver. Similarly, for CDMA, if the radio channel is nondispersive, then a correlator detector can be selected. Alternatively, if a time dispersive channel is detected, then a RAKE receiver can be used.

Various types of detector controllers can be implemented according to the present invention in order to select an appropriate detection scheme for a particular received signal. For example, a ratio of the received signal to noise parameters can be evaluated and compared with the threshold. Based upon a result of the comparison, an appropriate detection scheme can be implemented. For example, in a simple case, the comparison may indicate whether the channel is time dispersive or non-time dispersive. According to other exemplary embodiments, a specific number of channel taps which accurately model a particular radio channel may be identified and used to determine an appropriate detection scheme.

According to other exemplary embodiments of the present invention, a ratio of an energy of a main ray to the summed energies of any additional or secondary rays may be calculated in order to determine whether the channel is dispersive or nondispersive. In order to avoid fluctuations due to fading, the energies may be weighted or smoothed prior to being compared with a threshold.

BRIEF DESCRIPTION OF THE DRAWINGS

The features, objects and advantages of the invention will be understood by reading the following detailed description in conjunction with the drawings in which.

DETAILED DESCRIPTION

Figure 1:
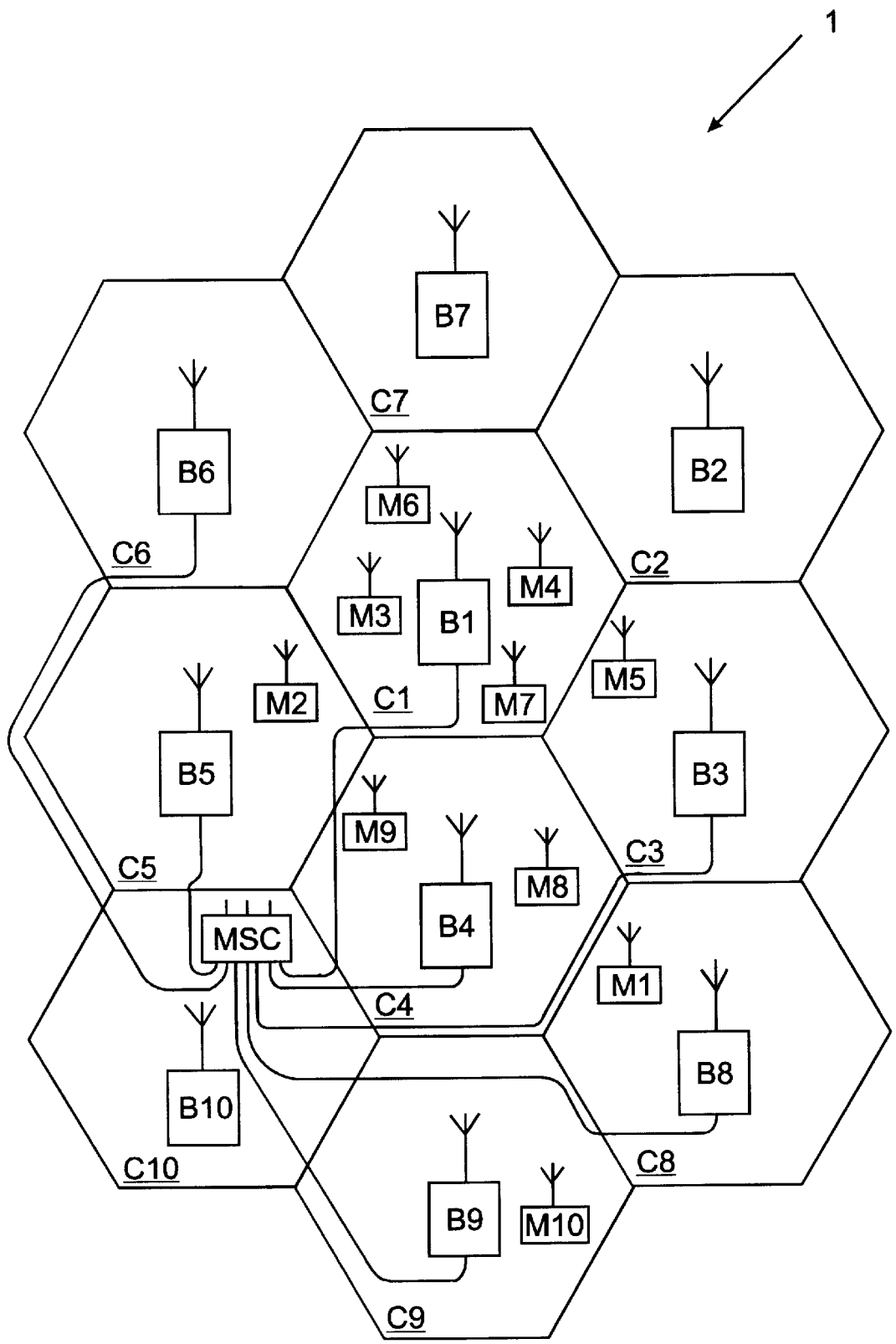
FIG. 1 is a block diagram illustrating ten cells in a cellular mobile radio telephone system to which the invention applies.

The various features of the invention will now be described with respect to the figures, in which like parts are identified with the same reference characters. Although the following description is provided in the context of non-spread systems, those skilled in the are will appreciate that the present invention is equally applicable to spread (e.g., CDMA) systems as well.

FIG. 1 is a schematic diagram illustrating the relationship between 10 cells (C1–C10) in a typical cellular telephone network 100 (herein referred to as a "cellular network") such as D-AMPS. Generally, a cellular network would have far more than ten cells; however, ten is sufficient for illustrative purposes.

In each cell C1 to C10, there is a base station B1 to B10. Although FIG. 1 shows the base stations located toward the center of each cell, base stations may be located anywhere in the cell. Base stations located toward the center typically employ omni-directional antennas, while base stations located toward a cell boundary typically employ directional antennas.

The cellular network 100 depicted in FIG. 1 also has a mobile switching center (MSC). The MSC connects to each of the base stations by cable, radio links, or both (not illustrated in FIG. 1). The MSC is also connected to a fixed telephone switching unit (also not illustrated in FIG. 1). The mobiles M1–M10 represent the mobile telephone units. Of course, the mobiles can move about in one cell or they can move about from one cell to another cell. Typically, there are far more mobiles than ten. Again, showing ten mobiles is sufficient for illustrative purposes.

Each mobile station includes a receiver (also not illustrated in FIG. 1) for receiving signals transmitted over the air interface from a base station to which that mobile station is currently listening. The receiver processes the received information symbols, e.g., using demodulation and detection techniques, to extract the information symbols included in the received signals.

Conventionally, these receivers included a detection device, e.g., an equalizer or a differential detector, used to identify the information symbols in the received signal stream. The selection of a particular detection device for inclusion in a receiver, e.g., an equalizer having some predetermined, fixed number of channel taps, was typically made based upon the radio environment in which the receiver was intended to operate. The present invention, however, takes another approach.

Figure 2:
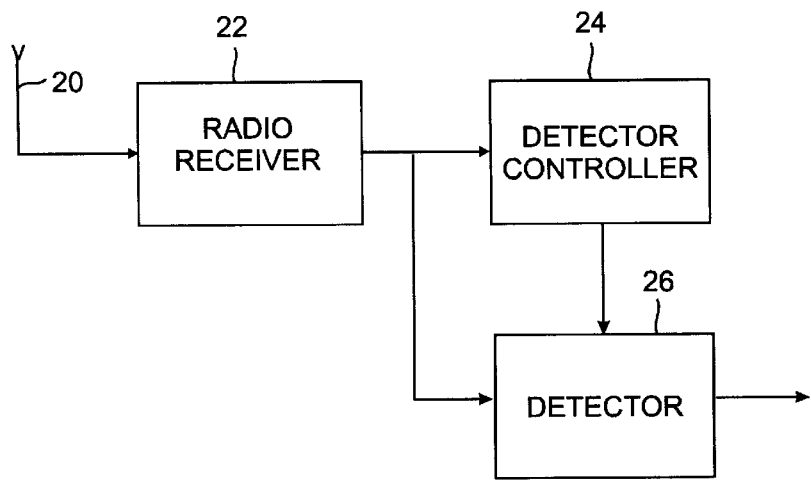
FIG. 2 is a general block diagram of a mobile station in accordance with one aspect of the present invention.

Referring to FIG. 2, a general block diagram of a mobile station according to the present invention is illustrated. Therein, a received signal stream is received at a mobile station on antenna 20. This signal stream is then processed, e.g., amplified, filtered and downconverted, in radio receiver 22 in accordance with known techniques to produce a stream of complex, baseband signal samples. The resultant stream is then fed to both a detector controller 24 and a detector 26. Detector controller 24 processes the received signal stream, as will be described in more detail below, to determine an optimal technique for performing detection of the information symbols in that stream. In accordance with the results of this processing, detector controller 24 will send an appropriate command to the detector 26, such that the detector 26 implements the selected detection technique. The output of detector 26 is an information symbol stream which is then processed further downstream to output user information (e.g., voice or data) or to respond to overhead control information (e.g., a paging message). The manner in which detector controller 24 operates to select a particular detection technique will now be discussed.

When a set of known synchronization symbols have been received, the receiver can then use the corresponding received data to form a detector controller output signal. For example, synchronization symbols can be used to perform least squares channel estimation or channel estimation using correlations between the synchronization symbols and the received data. Channel estimation information can be used to model the radio channel as including J channel taps. For example, a signal power Sest can be estimated by summing the magnitude squared of the channel taps, i.e., $$Sest(J) = \sum_{j=0}^{J-1} |c(j)|^2,$$

where c(j) represent the channel coefficient estimates. At the same time, the channel coefficient estimates and the known symbols can be used to form received data estimates, i.e., rest(k)=c(0)s(k)+c(1)s(k−1)+ . . . +c(J−1)s(k−J+1), where s(k)

represents the known synchronization symbols. These received data estimates can, in turn, be used to form a noise power estimate, Nest(J), by averaging the magnitude squared of r(k)−rest(k) over the received sync data. Thus, both Sest(J) and Nest(J) can be determined for various candidate values of J (e.g., J=1 . . . Jmax). Since system performance is usually related to these quantities, a comparison device can be used to determine how many channel taps need to be modeled to provide a desired degree of system performance. Note that in the absence of known symbols, hypothesized symbols can be used instead. Also, the number of taps used may change over time (e.g., within a TDMA time slot). Thus, detector controllers can vary the number of taps being used dynamically during reception. Having provided a conceptual overview of exemplary receiver structures according to the present invention, various techniques and structures for determining a desired detection scheme will now be described.

Figure 3:
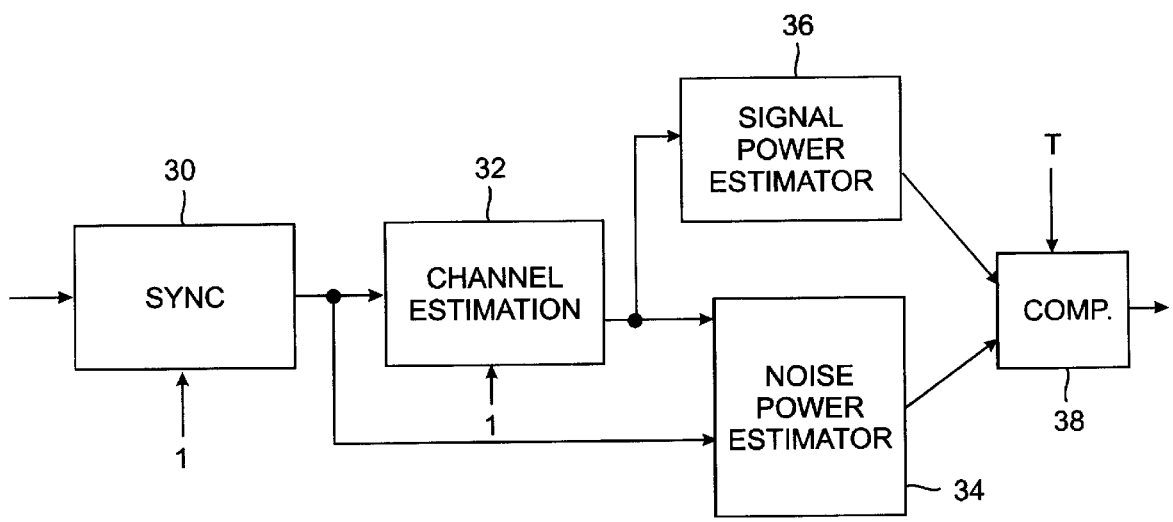
FIG. 3 is a diagram illustrating a first exemplary embodiment of the detector controller illustrated in FIG. 2.

One exemplary embodiment of the detector controller 24 is shown in FIG. 3, which is designed to determine whether dispersion is present or not (i.e., whether J>1 or J=1, respectively). This information can then be used to select an appropriate detection mechanism. For example, for channels using DQPSK modulation, a differential detector could be selected when J=1 and an equalizer could be selected when J>1.

In FIG. 3, the received data are passed through synchronization unit 30, which performs synchronization for the purposes of demodulation assuming that the channel is nondispersive, (i.e., assuming that J=1 as shown by the arrow leading from the "1" to SYNC block 30). The synchronized data are then used to determine an estimate of the single channel coefficient c(0) associated with a nondispersive channel in channel estimation unit 32, for example, using either of the known techniques mentioned above. The channel estimate and synchronized data are used by noise power estimator 34 to produce an estimate of the noise power over the synchronization field, denoted Nest(1). This can be accomplished by averaging $|r(k)-c(0)s(k)|^2$ over the synchronization field, since s(k), the transmitted synchronization symbols, are known. The channel estimate is also passed to signal power estimator 36, which gives Sest(1), by forming the magnitude squared of the channel coefficient, $|c(0)|^2$. Both Nest(1) and Sest(1) are passed to comparator 38, which determines if the signal-noise-ratio exceeds a given threshold T (which threshold is determined by the minimum SNR acceptable for adequate communications performance, which in turn can be determined by empirical testing as will be appreciated by those skilled in the art) i.e.:

Sest(1)/Nest(1)>T?

This evaluation can be implemented in a variety of ways to avoid division, such as by instead comparing:

Sest(1)>Nest(1) T?

If the threshold is exceeded, then the detector controller 24 (FIG. 2) sends a control signal to the controlled detector 26 indicating that a form of nondispersive signal detection, e.g., differential detection or single tap coherent detection, can be used. Otherwise, the control signal indicates that a form of dispersive signal detection, e.g., multi-tap equalization, is needed. Thus, this exemplary embodiment of the detector controller 24 determines whether the channel is dispersive (J>1) or not (J=1).

Figure 4:
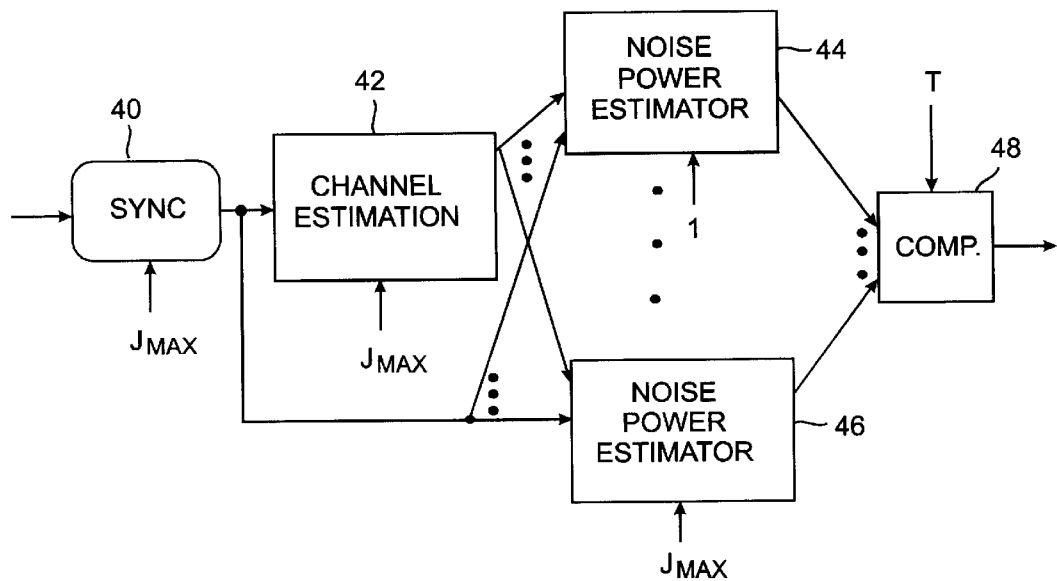
FIG. 4, is a diagram illustrating a second exemplary embodiment of the detector controller of FIG. 2.

A second exemplary embodiment of the detector controller 24 is illustrated in FIG. 4. In this embodiment, the controller 24 determines how much dispersion is present (i.e., the value of J, the number of channel taps). The synchronization 40 and channel estimation 42 units both operate under the assumption that some maximum number of channel taps (Jmax) are present, e.g., five taps. The channel taps and data are provided to a plurality of noise power estimators, one for each possible value of J. To simplify the drawings, only two such noise power estimators 44 and 46 are illustrated, i.e., for taps 1 and Jmax. For example, with each estimator assuming J taps, the noise power is estimated using the difference between r(k) and c(0)s(k)+ . . . +c(J−1)s(k−J+1). These estimates are compared with each other using threshold T in comparator 48. The value of J is then determined such that:

Nest(J+1)>T Nest(J)

where T is a design parameter between 0 and 1 which can be determined empirically and is typically just less than 1, e.g., 0.9. This gives the number of channel taps to be modeled in detector 26. Note that this exemplary embodiment could be modified to additionally form Sest(J) (e.g., as described with respect to FIG. 3) for each possible value of J and use both Nest(J) and Sest(J) in the comparator, i.e.:

T Sest(J+1)/Nest(J+1)<Sest(J)/Nest(J)

which is equivalent to the comparison:

Sest(J) Nest(J+1)>T Sest (J+1) Nest(J)

Figure 5:
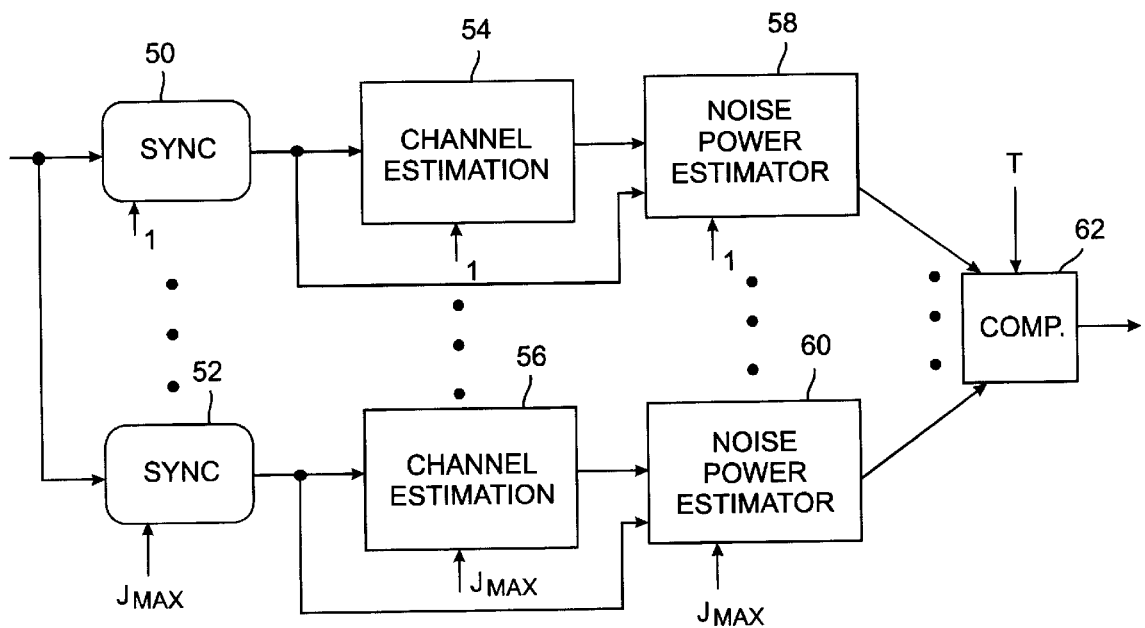
FIG. 5 is a diagram illustrating a third exemplary embodiment of the detector controller of FIG. 2.

A third exemplary embodiment of the detector controller is illustrated in FIG. 5. Using the ellipsis mark notation first seen in FIG. 4 to denote additional branches which are unillustrated, only blocks associated with J=1 and J=Jmax are shown to simplify the figure. Those skilled in the art will appreciate that similar branches would be provided for J=2, 3, 4, . . . etc. In this embodiment, different synchronization criteria are considered, each corresponding to different possible values for J, the number of channel tap coefficients. For example, the sync units 50 and 52 could be implemented to find synchronization such that the energy in the first and the last (Jmax), respectively, channel coefficients are maximized. The subsequent channel estimations in each branch (i.e., performed in blocks 54 and 56) also assume J taps, as do the noise power estimators, e.g., blocks 58 and 60. Then, as in FIG. 4, the estimates are compared in a manner similar to that described for FIG. 4. Again, signal power estimates can also be used to improve performance in a manner similar to that described for FIG. 4.

According to yet another exemplary embodiment of the present invention, the ratio of the energy associated with intersymbol interference (ISI) to the energy associated with the main ray can be used to estimate the amount of delay spread of a received signal. For example, assuming an L-tap channel model:

$$C(z) = C_0 + C_1 z^{-1} + \ldots C_{L-1} z^{(L-1)}$$

then the delay can be estimated by evaluating the ratio:

$$\lambda = \left[\sum_{k=1}^{L-1} |C_k|^2\right] / |C_0|^2$$

where $C_0$ is the channel coefficient associated with the first or strongest signal ray and $C_k$ is an array of remaining channel coefficients.

This ratio should, however, be weighted or smoothed to take into account instantaneous variations of $\lambda$ associated with fading. This smoothing can be performed using accumulated information from earlier estimates. For example, $$E_{0,s}(m) = \gamma E_{0,s}(m-1) + (1-\gamma) E_0(m),$$

$$E_{1,s}(m) = \gamma E_{1,s}(m-1) + (1-\gamma) E_1(m),$$

$$\hat{\lambda}(m) = \frac{E_{1,s}(m)}{E_{0,s}(m)}$$

where $$E_0(m) = |C_0(m)|^2, \quad E_1(m) = \sum_{k=1}^{L-1} |C_k|^2,$$

Figure 6:
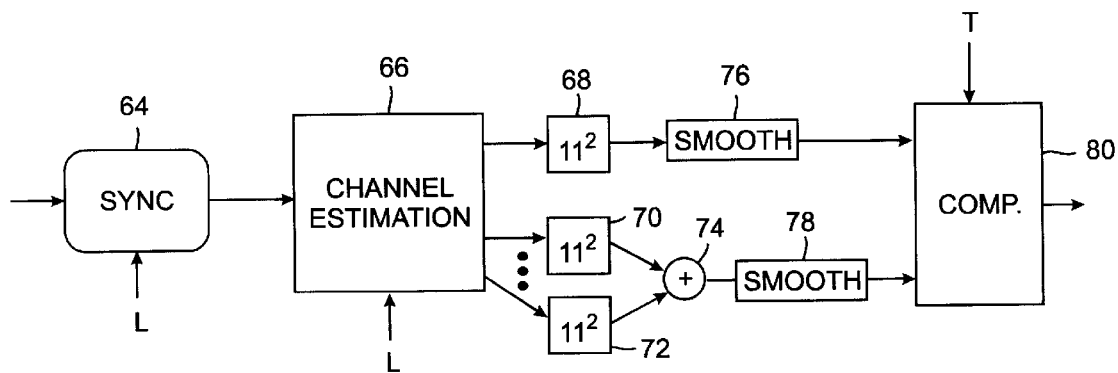
FIG. 6 is a diagram illustrating a fourth exemplary embodiment of the detector controller of FIG. 2.

The smoothed value, $\hat{\lambda}(m)$, can then be compared to a threshold to determine whether the channel is dispersive or non-dispersive. As with the previous embodiments, this information can then be used to select an appropriate detection technique. An exemplary implementation is illustrated in FIG. 6.

Therein, the incoming complex samples are synchronized assuming an L-tap channel model at block 64. Channel estimation, assuming L taps, is performed by channel estimation unit 66 to determine the channel coefficients. The channel coefficient associated with the first or strongest ray is passed to magnitude-squared function block 68. The remaining coefficients are passed to other magnitude-squared function blocks, e.g., blocks 70 and 72, whose outputs are summed at adder 74. Both the $C_0$ and ISI energies are smoothed, as described above by smoothing functions 76 and 78, respectively. The ratio of the smoothed energies is then compared with a threshold T in comparator 80, whose output characterizes the channel as dispersive or non-dispersive.

Figure 7:
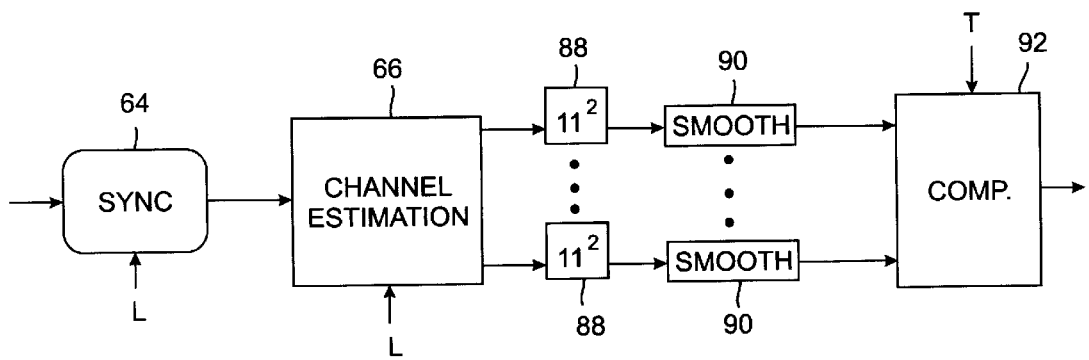
FIG. 7 is a diagram illustrating a fifth exemplary embodiment of the detector controller of FIG. 2.

An alternative embodiment is illustrated in FIG. 7 wherein like reference numerals are used to denote like devices. Therein, summing of the ISI energies is performed downstream of the smoothing functions 90 in comparator 92, rather than immediately after the magnitude-squared functions 88 as in FIG. 6. This allows determination of how much dispersion needs to be equalized by forming $\lambda_j$ for different values of J as:

$$\lambda_J = \left[\sum_{k=J}^{L-1} |C_k|^2\right] / \sum_{k=0}^{J-1} |C_k|^2$$

Figure 8:
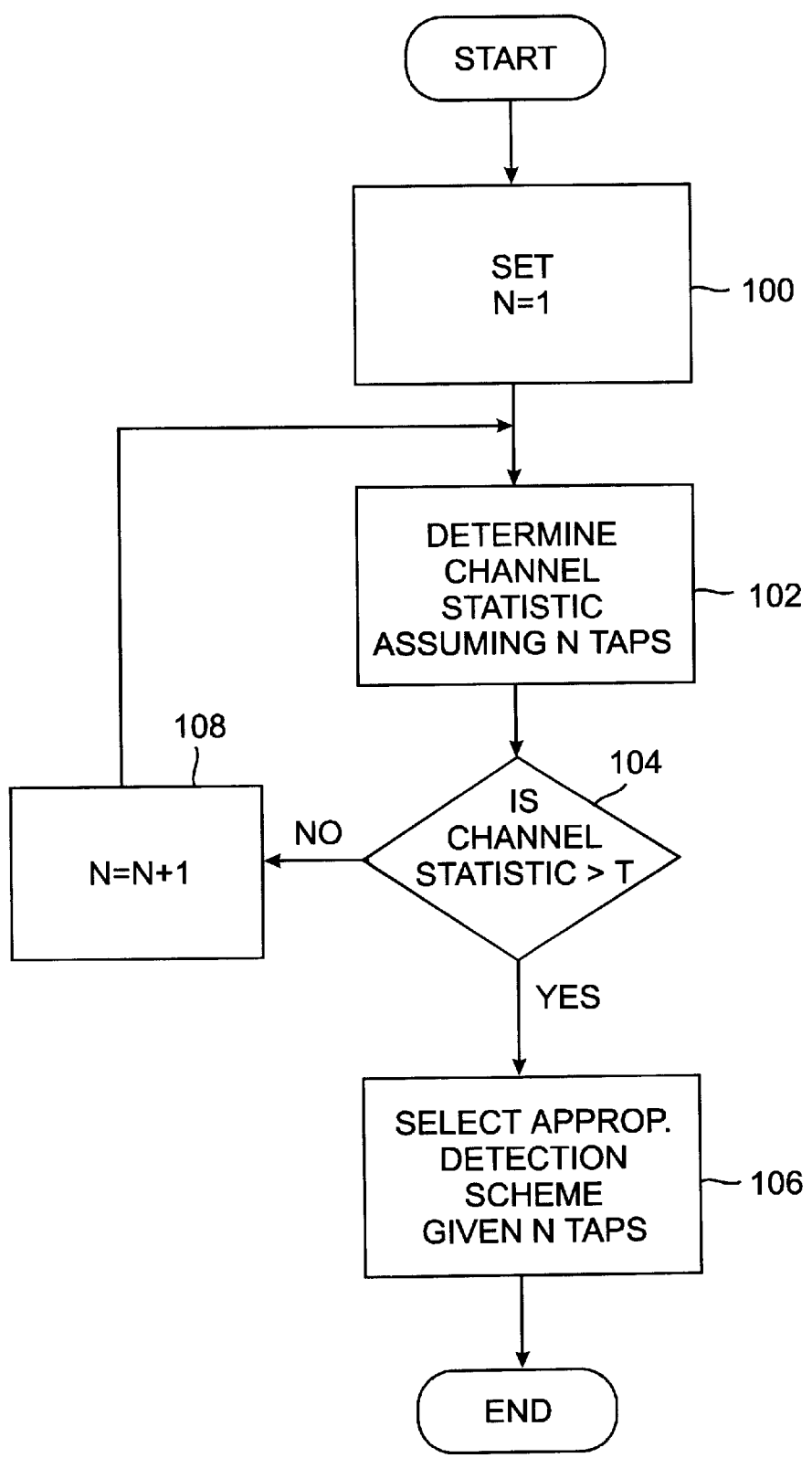
FIG. 8 is a flow chart depicting an exemplary method for selecting an appropriate detection technique according to an exemplary embodiment of the present invention.

According to yet another exemplary embodiment, L-taps are not assumed during synchronization in block 64. Instead, an iterative approach is taken wherein first one channel tap is assumed and the process depicted in either FIG. 6 or FIG. 7 is performed. If the resulting channel statistic is acceptable based upon the assumed number of channel taps, then the process ends, otherwise another iteration is performed assuming a different number of channel taps. This technique is illustrated by way of the flow chart of FIG. 8.

Therein, a channel tap variable N is set to one for the first pass at step 100. Next, the smoothed energy ratio (i.e., referred to as the "channel" statistic in FIG. 8) is determined at step 102 based upon synchronizing to the received signal assuming one channel tap. If the channel statistic is greater than a threshold T, which threshold is determined empirically to provide an adequate signal to ISI ratio, then N is an accurate number of taps for modeling this channel and the process moves to step 106 where an appropriate detection scheme is selected for detector 26. For example, if after the first iteration the channel statistic exceeds the threshold T, then the channel is nondispersive and a differential detection scheme can be used.

If, on the other hand, the channel statistic is less than the threshold T, then the flow moves to step 108. Therein, the channel tap variable N is incremented and the process is repeated assuming a model with one additional channel tap than the previous iteration for the purposes of synchronization. Note, however, that channel estimation is performed based upon the maximum number of taps.

The invention has been described with reference to a particular embodiment. However, it will be readily apparent to those skilled in the art that it is possible to embody the invention in specific forms other than those of the preferred embodiments described above. This may be done without departing from the spirit of the invention. The preferred embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A receiver comprising:
   processing circuitry for receiving a radio signal and producing signal samples therefrom;
   a detector controller which evaluates said signal samples and outputs a variable number, N, of channel taps needed for detection; and
   a detector, responsive to an output of said detector controller, for detecting symbols using one of a plurality of detection schemes which is selected based on the variable value of N.

2. The receiver of claim 1, wherein said detector uses a differential detection scheme when said output number of channel taps is one and a multitap equalization scheme when said output number of channel taps is greater than one.

3. The receiver of claim 1, wherein said detector uses a single tap coherent detection scheme when said output number of channel taps is one and a RAKE receiver detection scheme when said output number of channel taps is greater than one.

4. The receiver of claim 1, further comprising:
   a signal power estimator for estimating a signal power associated with said received signal; and
   a noise power estimator for estimating a noise power associated with said received signal.

5. The receiver of claim 4, wherein said detector controller determines said number of taps based upon a comparison between said estimated signal power and said estimated noise power.

6. The receiver of claim 5, wherein said detector controller synchronizes to said received signal and estimates a channel associated with said received signal based upon an assumption that the channel is nondispersive.

7. The receiver of claim 1, wherein said detector controller determines said number of taps based upon a comparison of a plurality of noise power estimates from which a level of time dispersion is identified, wherein each of said plurality of noise estimates is calculated assuming a different number of channel taps.

8. The receiver of claim 7, wherein said detector controller synchronizes to said received signal and estimates a channel associated with said received signal assuming a maximum number of channel taps, said channel estimates being used to calculate said noise power estimates.

9. The receiver of claim 7, further comprising:
   a signal power estimator, associated with each of said different number of channel taps, for estimating a signal power associated with said received signal, wherein said detector controller compares ratios of said signal power estimates to said noise power estimates for each of said different number of channel taps with a threshold.

10. The receiver of claim 1, further comprising:
    a plurality of branches, each branch including:
        a synchronization unit for synchronizing to said received signal assuming a predetermined number of channel taps;
        a channel estimation unit for estimating channel coefficients associated with said received signal assuming said predetermined number of channel taps; and
        a noise power estimation unit for estimating a noise power associated with said received signal assuming said predetermined number of channel taps;
    wherein said predetermined number of channel taps differs for each of said plurality of branches; and
    a comparator for receiving an output of each of said branches and comparing said outputs to determine said number of taps.

11. The receiver of claim 10, wherein an output from one branch is compared with a threshold multiplied by an output from another branch to determine said number of taps.

12. The receiver of claim 10, further comprising:
    a plurality of signal power estimators, one each associated with said plurality of branches, for estimating a signal power associated with said received signal, wherein said comparator compares a ratio of said signal power estimate to said noise power estimate for one of said plurality of branches with a ratio of said signal power estimate to said noise power estimate for another one of said plurality of branches multiplied by a threshold value.

13. The receiver of claim 1, wherein said detector controller outputs said number of taps based upon a comparison of energy associated with intersymbol interference with energy associated with a main ray of said received signal.

14. The receiver of claim 13, wherein said energy associated with intersymbol interference and said energy associated with the main ray of said received signal are smoothed prior to said comparison.

15. A receiver comprising:
    means for receiving a radio signal to produce a received signal;
    means for processing said received signal to produce complex samples;
    means for processing said complex samples to produce signal power estimates and noise power estimates;

means for comparing said signal power estimates and said noise power estimates to generate a detector control signal; and means for detecting digital symbols within said received signal using said complex samples and said control signal to determine a variable number of channel taps, N, needed to properly receive said received signal.

16. A method for selecting a number of channel taps for a detection scheme in a receiver comprising the steps of:

(a) initializing a variable number of channel taps N to one;

(b) evaluating a channel statistic using said variable number of channel taps N;

(c) comparing said channel statistic to a threshold;

(d) selectively selecting N as a number of channel taps used in a detection scheme based upon a result of said comparison step; and (e) otherwise, incrementing said variable number of channel taps N and performing another iteration of steps (b)–(e).

17. The receiver of claim 1, wherein said detector controller outputs said number of taps based upon a comparison of energy associated with intersymbol interference with energy associated with equalized rays of said received signal.

* * * * *

UNITED STATES PATENT AND TRADEMARK OFFICE
CERTIFICATE OF CORRECTION

PATENT NO. : 6,333,953 B1
DATED : December 25, 2001
INVENTOR(S) : Bottomley et al.

Page 1 of 1

It is certified that error appears in the above-identified patent and that said Letters Patent is hereby corrected as shown below:

Title page,
Item [56], References Cited, U.S. PATENT DOCUMENTS, the following references should be listed:
-- 5,596,607   01/1997   Larsson et al   375/340
   5,822,380   10/1998   Bottomley   375/347 --.
FOREIGN PATENT DOCUMENTS, the following reference should be listed:
-- PCT   WO 97/24849   07/1997
   PCT   WO 94/18752   08/1994
   EP    516,133       12/1992
   GB    2,286,952     08/1995 --.
OTHER PUBLICATIONS, the following references should be listed:
-- European Standard Search Report re RS 99940; Date of completion of search: 20 January 1998

Minori Matsui et al., "New Block Demodulator with an Automatic Equalizer", Electronics and Communications in Japan, Part I – Communications, Vol. 74, No. 2, pp. 28-35 (February 1991) --.

Signed and Sealed this

Third Day of January, 2006

JON W. DUDAS
*Director of the United States Patent and Trademark Office*